P. GREENWALD.
Improvement in Cigar-Boxes.
No. 127,597.    Patented June 4, 1872.
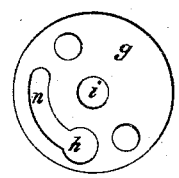
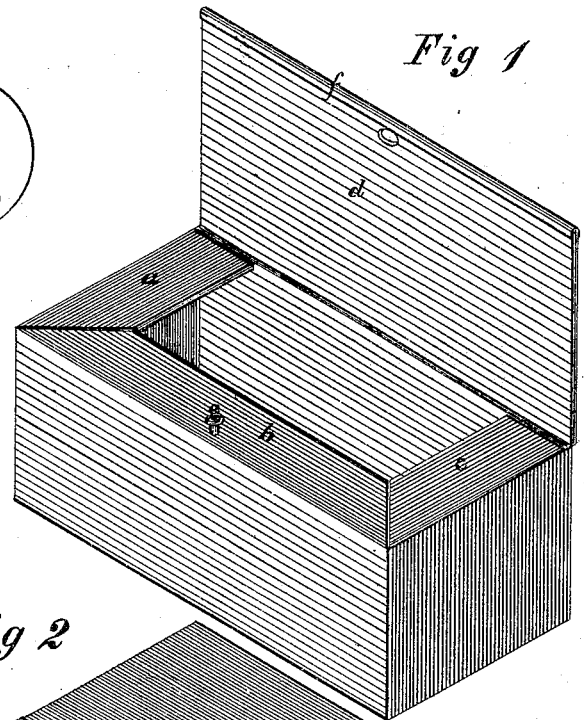
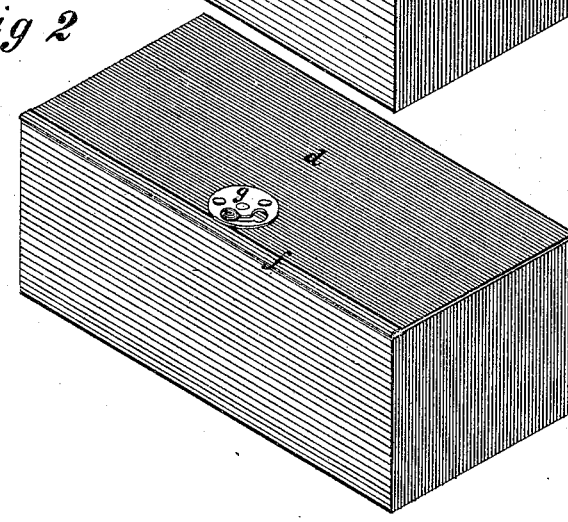

127,597

UNITED STATES PATENT OFFICE.

PHILIP GREENWALD, OF SYRACUSE, NEW YORK, ASSIGNOR TO HIMSELF AND DANIEL DONAHUE, OF SAME PLACE.

IMPROVEMENT IN CIGAR-BOXES.

Specification forming part of Letters Patent No. 127,597, dated June 4, 1872.

Be it known that I, PHILIP GREENWALD, of Syracuse, in the county of Onondaga and State of New York, have invented a new and useful Improvement in Cigar-Boxes; and that the following is a clear and exact description of the same, reference being had to the accompanying drawing making a part of the specification, in which—

Figure 1 represents the box open and the folds $a\ b\ c$ in position when packed with cigars. Fig. 2 represents the lid or cover closed.

The letter $f$ on the cover $d$ represents the edging or binding on the lid or cover.

Similar letters of reference, where they occur in the several separate figures, indicate like parts in the drawing.

My improvement consists in a cigar-box, having the edging or binding $f$ on the cover or lid $d$, and the folds $a\ b\ c$ attached to the body of the box, as hereinafter described.

To enable others skilled in the art to make and use my improvement, I will proceed to describe the same with reference to the drawing.

I construct the lid or cover $d$ with edging or binding, as represented in Figs. 1, 2, to prevent the lid or cover from warping. I construct the folds $a\ b\ c$, Fig. 1, mitered at the ends, as therein represented, and hinged to the body of the box by means of a hinge made of cotton cloth glued to the inside of the box and under side of the folds, and English book-muslin glued to the outside of the box and to the top side of the folds, allowing them to open and close down, as represented in Fig. 1, the folds being so constructed and for the purpose of forming a brace to prevent the ends and sides of the box from springing in or out, and thereby keeping the ends and sides in position and in proper shape.

I usually make the lid or cover and the folds of tar-board, and the edging or binding to the cover of brass.

Having thus described my improvement, what I claim as new and useful, and desire to secure by Letters Patent, is—

A cigar-box with the folds $a\ b\ c$, and with the brass edging or binding $f$ to the lid $d$, when constructed substantially as and for the purpose described.

PHILIP GREENWALD.

Witness:
    FREDERIC A. LYMAN,
    A. C. PHILLIPS.